(12) United States Patent
Kaplan et al.

(10) Patent No.: US 7,893,990 B1
(45) Date of Patent: Feb. 22, 2011

(54) DIGITAL VIDEO CAMERA WITH RETRACTABLE DATA CONNECTOR AND RESIDENT SOFTWARE APPLICATION

(75) Inventors: Jonathan Kaplan, San Francisco, CA (US); Ariel Braunstein, San Francisco, CA (US); John Louis Warpakowski Furlan, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 11/497,039

(22) Filed: Jul. 31, 2006

(51) Int. Cl.
*G03B 17/02* (2006.01)
*H04N 5/225* (2006.01)

(52) U.S. Cl. .................. 348/373; 348/374; 348/375; 348/376

(58) Field of Classification Search .............. 348/207.1, 348/207.2, 207.11, 207.99, 373–376
See application file for complete search history.

(56) References Cited

U.S. PATENT DOCUMENTS

| | | | |
|---|---|---|---|
| 6,129,572 A * | 10/2000 | Feldman et al. ............. | 439/328 |
| D453,148 S | 1/2002 | Alexander | |
| D463,426 S | 9/2002 | Cheng | |
| 6,449,438 B1 * | 9/2002 | Gennetten .................... | 396/300 |
| 6,477,138 B1 * | 11/2002 | Cho et al. .................... | 720/742 |
| 6,577,337 B1 | 6/2003 | Kang | |
| 6,587,151 B1 * | 7/2003 | Cipolla et al. ................. | 348/373 |
| 6,628,325 B1 | 9/2003 | Steinberg et al. | |
| D482,694 S | 11/2003 | Chen | |
| D486,171 S | 2/2004 | Nishiura | |
| 6,720,998 B1 | 4/2004 | Kim | |
| 6,727,952 B1 | 4/2004 | Hirata et al. | |
| 6,731,956 B2 | 5/2004 | Hanna et al. | |
| 6,743,030 B2 | 6/2004 | Lin et al. | |
| 6,750,902 B1 | 6/2004 | Steinberg et al. | |
| 6,784,941 B1 | 8/2004 | Su et al. | |
| 6,786,743 B2 | 9/2004 | Huang | |
| 6,806,978 B1 * | 10/2004 | Tamura et al. ............. | 358/1.15 |
| 6,808,400 B2 | 10/2004 | Tu | |
| 6,819,355 B1 * | 11/2004 | Niikawa ................. | 348/207.11 |
| 6,829,004 B1 * | 12/2004 | Abe ............................ | 348/96 |
| 6,833,863 B1 | 12/2004 | Clemens | |
| 6,873,356 B1 * | 3/2005 | Kanbe et al. ............. | 348/207.1 |
| 6,941,021 B2 | 9/2005 | Goldstein et al. | |

(Continued)

OTHER PUBLICATIONS

Chicago Tribune, "TECHBUZZ: This videocam is easy to keep at fingertips", by Eric Benderoff Published May 8, 2006, 3 pages.

(Continued)

*Primary Examiner* — David L Ometz
*Assistant Examiner* — Dwight Alex C Tejano
(74) *Attorney, Agent, or Firm* — Patterson & Sheridan, LLP

(57) ABSTRACT

A digital video camera may include a digital video image sensor for capturing digital video footage to be stored on an internal memory. The digital video image sensor and internal memory may be housed in a camera body. A retractable arm having a data connector may be attached to the camera body. The arm can be extended from and retracted into the camera body, while the data connector can be used to transfer digital video footage to an external device, such as a computer. The data connector may conform to a standard for connecting peripheral devices, such as the Universal Serial Bus (USB) standard or the Institute of Electrical and Electronics Engineers 1394 (IEEE 1394) standard.

13 Claims, 6 Drawing Sheets

U.S. PATENT DOCUMENTS

| | | | |
|---|---|---|---|
| 6,950,142 | B2 | 9/2005 | Soumi et al. |
| 6,979,210 | B2 | 12/2005 | Regen et al. |
| 6,992,721 | B1 * | 1/2006 | Kambayashi et al. ....... 348/373 |
| 7,004,780 | B1 | 2/2006 | Wang |
| 7,025,275 | B2 * | 4/2006 | Huang et al. ................ 235/486 |
| 7,070,425 | B2 | 7/2006 | Regen et al. |
| 7,090,515 | B2 | 8/2006 | Regen et al. |
| 7,126,629 | B1 | 10/2006 | Braunstein et al. |
| D531,581 | S | 11/2006 | Wang |
| 7,142,244 | B1 * | 11/2006 | Barbeau ..................... 348/373 |
| 7,286,182 | B2 * | 10/2007 | Silverbrook et al. ........ 348/375 |
| 7,286,256 | B2 * | 10/2007 | Herbert ..................... 358/1.16 |
| 7,295,431 | B2 * | 11/2007 | Chuang ................ 361/679.55 |
| D561,702 | S | 2/2008 | Ohta |
| 7,349,010 | B2 * | 3/2008 | Bryant et al. ............ 348/207.1 |
| 7,385,630 | B2 * | 6/2008 | King et al. ............... 348/207.2 |
| 7,389,878 | B1 * | 6/2008 | Torrico ....................... 206/725 |
| 7,443,418 | B2 * | 10/2008 | Bryant et al. ............ 348/207.1 |
| 7,462,044 | B1 | 12/2008 | Regen et al. |
| 7,465,925 | B2 | 12/2008 | Antanouski et al. |
| 7,566,231 | B2 | 7/2009 | Regen et al. |
| D608,813 | S | 1/2010 | Hong |
| 2002/0101515 | A1 | 8/2002 | Yoshida et al. |
| 2003/0063215 | A1 | 4/2003 | Tsuji |
| 2003/0227551 | A1 * | 12/2003 | Kudo .................... 348/207.99 |
| 2004/0145676 | A1 | 7/2004 | Lin |
| 2004/0155966 | A1 * | 8/2004 | Jang et al. ................ 348/207.1 |
| 2004/0201692 | A1 * | 10/2004 | Parulski et al. ........... 348/207.1 |
| 2004/0212966 | A1 | 10/2004 | Fisher et al. |
| 2004/0263634 | A1 | 12/2004 | Kiuchi |
| 2005/0037647 | A1 | 2/2005 | Le |
| 2005/0050371 | A1 | 3/2005 | Ono |
| 2005/0060636 | A1 | 3/2005 | Mathe |
| 2005/0070225 | A1 | 3/2005 | Lee |
| 2005/0079738 | A1 | 4/2005 | Ahn |
| 2005/0099499 | A1 | 5/2005 | Braunstein et al. |
| 2005/0114587 | A1 | 5/2005 | Chou et al. |
| 2005/0157459 | A1 | 7/2005 | Yin et al. |
| 2005/0161513 | A1 * | 7/2005 | Huang et al. ................ 235/492 |
| 2005/0174710 | A1 | 8/2005 | Masui et al. |
| 2005/0177661 | A1 | 8/2005 | Loo |
| 2005/0210195 | A1 | 9/2005 | Teicher et al. |
| 2005/0237356 | A1 | 10/2005 | Lee |
| 2005/0237398 | A1 | 10/2005 | Fujii et al. |
| 2005/0253930 | A1 | 11/2005 | Endo et al. |
| 2005/0265099 | A1 | 12/2005 | Hosokawa |
| 2005/0280732 | A1 * | 12/2005 | Misawa ................ 348/333.06 |
| 2005/0285963 | A1 * | 12/2005 | Misawa et al. ......... 348/333.06 |
| 2006/0015662 | A1 | 1/2006 | Dietz et al. |
| 2006/0036784 | A1 | 2/2006 | Loo |
| 2006/0064185 | A1 | 3/2006 | Yeh |
| 2006/0075411 | A1 | 4/2006 | Yeh |
| 2006/0092302 | A1 | 5/2006 | Lee |
| 2006/0103767 | A1 | 5/2006 | Okisu et al. |
| 2006/0109349 | A1 | 5/2006 | Takashima |
| 2006/0211283 | A1 | 9/2006 | Weng |
| 2006/0216973 | A1 * | 9/2006 | Walmsley et al. ............. 439/83 |
| 2006/0223369 | A1 * | 10/2006 | Zheng ........................ 439/607 |
| 2007/0022232 | A1 * | 1/2007 | Bhakta et al. ................. 710/62 |
| 2007/0066130 | A1 | 3/2007 | Mori |
| 2008/0014829 | A1 * | 1/2008 | Dyer et al. ................... 446/297 |

OTHER PUBLICATIONS

Los Angeles Times, "TECHNOPOLIS: The Small Easy: Device Creates Instant Video". By David Colker Published May 25, 2006, 4 pages.

Time Magazine, "The Most Amazing Inventions of 2005", by Dennis Galante Posted Nov. 13, 2005, 1 page.

USA Today, "New breed of tiny camcorder simple to use, easy on wallet", by Jack Gruber Posted May 1, 2006, 2 pages.

Wall Street Journal, "The Video Camera Revised", by Walter S. Mossberg and Katherine Boehret Published May 3, 2006, 5 pages.

Office Action, U.S. Appl. No. 12/327,727, dated Mar. 4, 2010.

Final Office Action, U.S. Appl. No. 12/327,779 dated Oct. 5, 2010.

Final Office Action, U.S. Appl. No. 12/327,764 dated Nov. 26, 2010.

* cited by examiner

DIGITAL VIDEO CAMERA WITH RETRACTABLE DATA CONNECTOR AND RESIDENT SOFTWARE APPLICATION

FIELD OF THE INVENTION

Embodiments of the invention generally relate to the field of digital imaging. More particularly, an aspect of an embodiment of the present invention relates to the field of digital video cameras.

BACKGROUND

Digital video cameras can offer many conveniences over conventional analog video cameras. However, some of the benefits they confer, such as the ability to view, store, and share videos, are often limited to those having a minimum level of expertise in using digital video cameras and personal computer systems. Realizing such benefits may also require complex procedures that not all users may be willing or able to perform.

In addition to the digital video camera itself, the use of a digital video camera often requires tapes, data connector cables, and additional software. Each of these additional items adds complexity to the process for capturing digital video, downloading digital video to a computer, and sharing digital videos with others. In some cases, a data cable must be available before digital video can be downloaded from the digital video camera. In other instances, special software must be installed in a personal computer from a compact disc (CD) or digital video disc (DVD) before digital video can be downloaded from the digital video camera.

Thus, users who wish to capture, store, and share digital videos can benefit from a digital video camera that incorporates components required to accomplish these tasks into a single portable unit. Such a simplification can lead to both ease of use for the end-user and a reduction of manufacturing costs for the manufacturer.

SUMMARY OF THE INVENTION

A digital video camera may include a digital video image sensor for capturing digital video footage to be stored on an internal memory. The digital video image sensor and internal memory may be housed in a camera body. A retractable arm having a data connector may be attached to the camera body. The arm can be extended from and retracted into the camera body, while the data connector can be used to transfer digital video footage to an external device, such as a computer. The data connector may conform to a standard for connecting peripheral devices, such as the Universal Serial Bus (USB) standard or the Institute of Electrical and Electronics Engineers 1394 (IEEE 1394) standard.

BRIEF DESCRIPTION OF THE DRAWINGS

The drawings refer to the invention in which.

Figure 1:
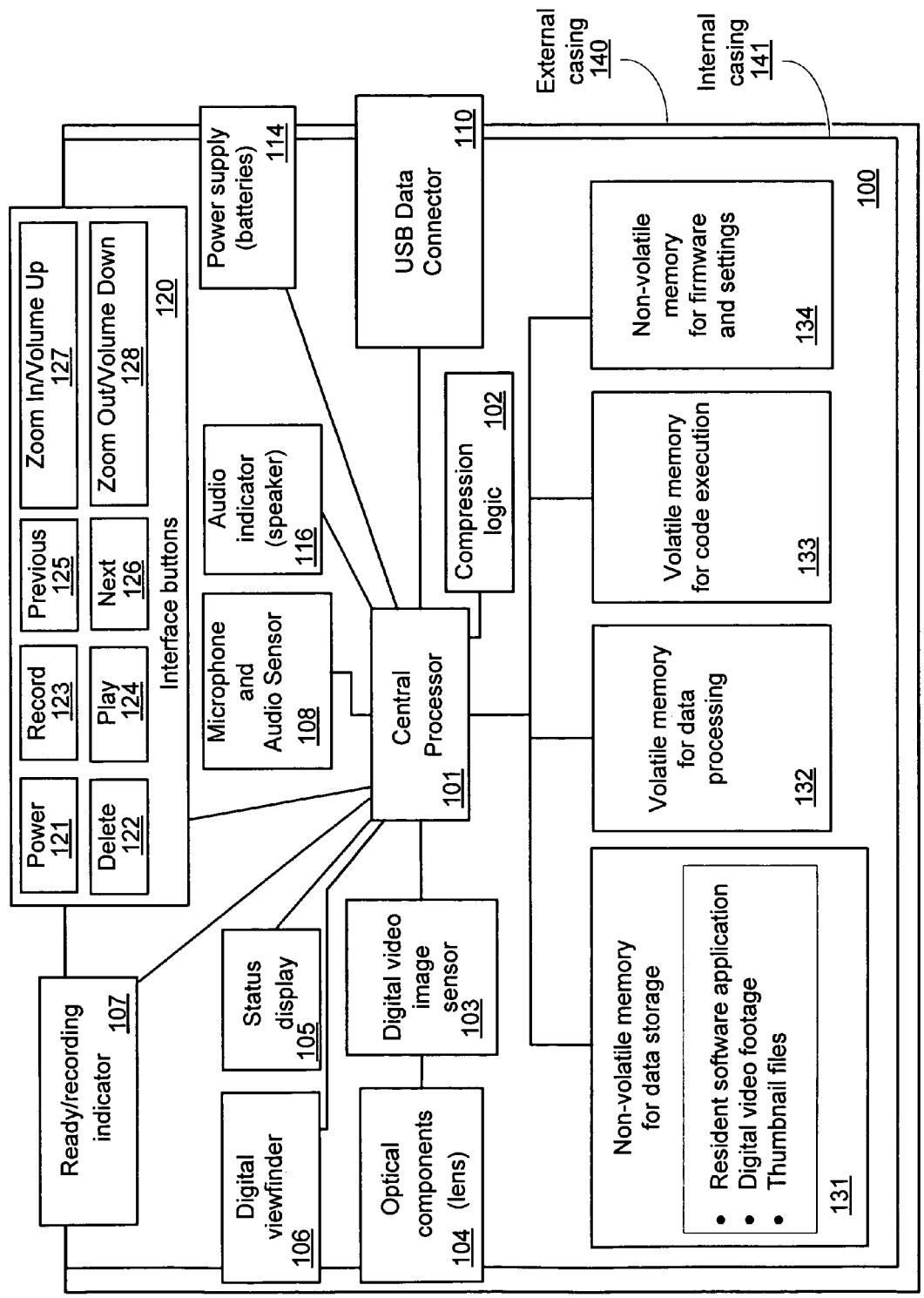
FIG. 1 illustrates a block diagram according to one embodiment of a digital video camera.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific functions, named components, connections, protocols, compression standards, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, a digital video camera may include a digital video image sensor for capturing digital video footage to be stored on an internal memory. The digital video image sensor and internal memory may be housed in a camera body. A retractable arm having a data connector may be attached to the camera body. The arm can be extended from and retracted into the camera body, while the data connector can be used to transfer digital video footage to an external device, such as a computer. The retractable arm is an external plug that may be rigid or semi-flexible that easily plugs into an external device and easily retracts into the camera body. The data connector may conform to a standard for connecting peripheral devices, such as the Universal Serial Bus (USB) standard, the Institute of Electrical and Electronics Engineers (IEEE) 1394 standard, or a similar standard.

FIG. 1 illustrates one embodiment of a block diagram of a digital video camera 100. The digital video camera 100 may have a digital video image sensor 103, such as 1280×1024 Pixel Complementary Metal Oxide Semiconductor (CMOS) sensor or a Charge Coupled Device (CCD); an internal volatile memory 133 for code execution and temporary video content capture, such as 32 megabytes of Synchronous Dynamic Random Access Memory (SDRAM); an internal volatile memory 132 for data processing, and an internal non-volatile memory for data storage 131 to store the captured digital video data. Digital video camera 100 may also have an internal non-volatile memory 134 for storage of firmware and settings; a central processor 101, such as a microcontroller, an ASIC, or other processor; a data connector 110, such as a Universal Serial Bus (USB) or Institute of Electrical and Electronics Engineers (IEEE) 1394 interface; a digital view finder 106; a status display 105, such as a liquid crystal display (LCD); a power supply 114, such as batteries; an audio indicator 116, such as a speaker; optical components 104; a microphone and audio sensor 128; a ready/recording indicator 107; and interface buttons 120.

The digital video image sensor 103 may convert an optical image filmed by the camera into a data array. The optical components 104, which may include a lens, project the actual images onto the digital video image sensor 103 to convert the analog images into an array of digital information. The digital video image sensor 103 quantifies the variable shades of light focused on the digital video image sensor 103 by the optical components 104 into data arrays representing a discrete number of colors. In one embodiment, the digital video image sensor is at least capable of operation between night-time or dusk conditions and brighter light conditions such as 10 lux to 10,000 lux, where 1 lux is a measure of illumination equivalent to 1 lumen per square meter. The digital video image sensor may be capable of operating in lighting conditions dimmer than 10 lux and brighter than 10,000 lux. The digital video image sensor 103 may also contain an ASIC to provide several optional features such as automatic exposure adjustment, automatic white balance, and automatic gamma compensation. The automatic exposure adjustment changes the light sensitivity of digital video image sensor 103 depending upon the lighting conditions. The automatic white balance balances the hue of the color spectrum represented in the data array.

The image capturing components, including the digital video image sensor 103 and the optical components 104, may be capable of capturing large and rapid sequences of photos such as 30 frames per second or more over any period of time. The digital video image sensor 103 may either be a CMOS sensor, CCD sensor, or other similar sensor to support this frame rate. The microphone and audio sensor 108 captures the sound corresponding to the captured images. The microphone and audio sensor 108 and the digital video image sensor 103 combine to supply the captured video content to the central processor 101. The digital video camera 100 may capture a very rapid succession of still images and store a soundtrack synchronized with the images.

When the video content is captured in a digital form, the video content is easily compressible to store or transfer the video content, modifiable to enhance the quality of the final video product, and transferable within the digital video camera 100 and to components external to the digital video camera 100.

The internal memory components are used to both store the video stream of data as well as to develop the video stream of data. The internal memory components are also used during execution of code necessary to operate the digital video camera 100. Digital video camera 100 may contain multiple types of internal memory components, each type customized for a different purpose and cost. The two main types of internal memory may include volatile memory, such as synchronous dynamic random access memory (SDRAM), dynamic random access memory (DRAM), and non-volatile memory, such as flash memory and write-once memory. The non-volatile memory for data storage 131, such as a portion of a hard disk or a flash memory module, and the non-volatile memory for firmware and settings 134 are examples of non-volatile memories. Volatile memory for data processing 132 and volatile memory for code execution 133 are examples of volatile memories.

The non-volatile memory for data storage 131 may be used in the digital video camera 100 to store any type of data. For example, the non-volatile memory 131 may be used to store digital video footage captured using the digital video image sensor 103, thumbnail files associated with digital video files, or a resident software application. The non-volatile memory 131 can also store still photo files, audio files, or any other type of data. In one embodiment, the non-volatile memory 131 may include non-volatile memory such as a 512 megabyte NAND flash memory module or another type of flash memory module, so that the contents of the non-volatile memory 131 are preserved even when no power is being supplied to the non-volatile memory 131. The non-volatile memory 131 may also utilize storage technologies besides flash memory technology. For instance, the non-volatile memory 131 could also be implemented by a hard disk drive or optical media such as a writable CD or DVD. In one embodiment, the non-volatile memory 131 may be removable from the digital video camera 100. A user can then change the capacity or the content of memory available to the digital video camera 100. In other embodiments, the non-volatile memory 131 may not be removable from the digital camera 100. In a digital video camera 100 having a non-removable non-volatile memory 131, the use of the digital video camera 100 is simplified because non-volatile memory 131 will always be available for storage of digital video footage or other data.

The central processor 101 may execute the firmware instructions stored in the non-volatile memory 134 and copy the instructions to the volatile memory 133 for execution. The central processor 101 controls the operation of the digital video camera 100. The central processor 101 also has logic to process the stream of data that is generated by the image and audio capturing components and transform the captured video content into a pre-defined file structure. The central processor 101 may also use portions of the volatile memory 132 to convert the raw data into captured video content in a proprietary or a standard video file format, such as Moving Picture Experts Group (MPEG) MPEG-1, MPEG-2, MPEG-4, or Motion Joint Photographic Experts Group (M-JPEG). The compression logic 102 may compress the video data prior to the storing of the captured video data in the non-volatile memory 131.

The compression logic 102 may use video and audio compression techniques such as variants of Moving Pictures Experts Group (MPEG), Motion Joint Photographic Experts Group (M-JPEG), Pulse Code Modulation (PCM) or similar compression standards. The compression logic 102 may compress video and audio data by compression of composed video images, compression of three video channels (R, G, B), compression of raw sensor data in separate video channels (R, G1, B, G2), down sampling the frame-rate of a video stream, or by conducting other similar compression techniques.

The data connector 110 may facilitate communications between the components internal to the digital video camera 100 and devices external to the digital video camera 100. Communication components at the data connector 110 may include controllers and a circuit to allow data from the non-volatile memory for data storage 131 to be transferred to one or more external devices. The data may be transferred according to a communication protocol such as IEEE 1394, USB 1 or 2, MicroWire, or other communication protocol. The data transfer process may also include data compression, encryption, and decryption processes.

The digital viewfinder 106 allows a user to frame a scene to be captured as digital video footage. A user can also use the digital viewfinder 106 to view the scene while the capture is taking place. The display of the digital viewfinder 106 also allows the user to review video data that has been recorded in the non-volatile memory for data storage 131. Thus, the digital viewfinder 106 may be used for both targeting the subject of the video capture as well as reviewing the captured data. The digital viewfinder 106 may be an active electronic component such as an active matrix or reflective liquid crystal display (LCD). The playback display portion of the digital viewfinder 106 may be a higher quality multi-shade display capable of showing dual-tone or full color pictures and/or video segments. The digital video camera 100 may also have an optical viewfinder (not shown) implemented using a set of lenses and optical elements.

The status display 105 visually communicates information, such as displaying current camera status, remaining recording time, battery level, low lighting conditions, and other similar information. The status display 105 may include an LCD, which may be an ultra low-energy consumption black and white segment-based display that shows pre-defined symbols and patterns.

Ready/recording indicator 107 may also visually communicate information, such as ready state and recording mode information to a user. The ready/recording indicator 107, for instance, may include a light emitting diode (LED) which can be lit, blinking, or off, depending on whether the camera is either ready to begin recording or currently recording.

The digital video camera 100 may have a camera body made from an internal casing 141 and an external casing 140. The casings 141 and 140 protect the digital video camera during handling and use. The internal casing 141 may contain the electronic components associated with the digital video camera 100. The external casing 140 may be a hard shell designed to protect the digital video camera 100. A layer of protective material, such as Styrofoam, may exist between parts of the internal casing 141 and external casing 140.

The power supply 114 supplies power for all of the components within the digital video camera 100, however, once the video content is captured and stored in the non-volatile memory for data storage 131, then the power supply 114 is no longer required to maintain the captured video data. The power supply 114 may contain several circuits with different power requirements. The power supply 114 may include any type of battery, single-use or rechargeable, or may be an external alternating current (AC) or direct current (DC) power source.

The interface buttons 120 may include physical buttons such as a power button 121 for enabling power supply 114; a delete button 122 for deleting data from the non-volatile memory for data storage 131; a record button 123 for beginning capture of digital video footage when the digital video camera 100 is in a ready state, and ending capture of digital video footage when the digital video camera 100 is in a recording state; and a play button 124 for playing digital video footage from non-volatile memory 131. The interface buttons 120 may also include a previous button 125, a next button 126, a zoom in/volume up button 127, and a zoom out/volume down button 128. The previous 125, next 126, zoom in/volume up 127, and zoom out/volume down 128 buttons may be located on a four-position rocker switch. The previous button 125 and the next button 126 can be used to select one of several digital video files stored on the non-volatile memory 131 for playback or deletion. The zoom in/volume up button 127 and the zoom out/volume down button 128 may operate as soft-key buttons, which can have different functions depending on a mode in which the digital camera 100 is operating. For example, while the digital video camera 100 is playing back content, the zoom in/volume up button 127 can be used to increase the audio volume. Otherwise, the zoom in/volume up button 127 can be used to increase the apparent focal length, or zoom, of an image being captured or viewed on the digital viewfinder 106. Likewise, the zoom out/volume down button 128 can operate to either decrease the audio volume during playback or decrease the apparent focal length of an image being captured or viewed.

The non-volatile memory for firmware 134 may store firmware instructions for functional features that provide the consumer with a better usage experience. The firmware allows a user to perform various actions related to the capture, playback, and deletion of digital video footage. For instance, the firmware begins the capture of digital video footage upon detecting a press of the record button 123 while the camera is in a ready state and ends the capture of digital video footage when the record button 123 is pressed while the digital camera 100 is recording. The firmware may also allow a user to select from digital video files stored in the non-volatile memory for data storage 131 using the previous button 125 and the next button 126. The firmware may further allow the user to play back a selected digital video clip by pressing the play button 124, or to delete a selected digital video clip from the non-volatile memory 131 by pressing the delete button 122. Upon deletion of a digital video clip from the non-volatile memory 131, the firmware may recalculate and display the remaining time available for recording, based on the available space in the non-volatile memory 131. The firmware thus maximizes the utility of the available non-volatile memory 131 capacity, since a user can delete unwanted digital video footage or other data to make room for additional digital video footage or other data. The firmware may also provide other features such as a timer function. In one embodiment, the timer function implemented by the firmware can cause the digital video camera 100 to wait for a predetermined time before automatically capturing a digital video clip having a pre-defined duration. For example, the digital video camera 100 may automatically record fifteen seconds of video after ten second delay following activation of the timer function.

The firmware may also automatically generate a thumbnail image associated with each digital video file stored in the non-volatile memory for data storage 131. The thumbnail file may also be stored in the non-volatile memory 131 and may be used by the firmware to represent digital video files in the digital viewfinder interface, on a television screen, or on a display associated with an external device. The thumbnail files can be used in this way to suggest the content of digital video files to a user. Thumbnail files may also be similarly generated and used by a resident software application stored in the non-volatile memory for data storage 131.

The digital video camera 100 may also capture high quality still images instead of a digital video clip. For example, a single high-resolution still photo shot may occupy as much memory as 15 seconds of digital video footage in the non-volatile memory for data storage 131. The digital camera 100 may also record an audio segment associated with a still photo shot, and store the audio segment in the non-volatile memory 131.

Figure 2:
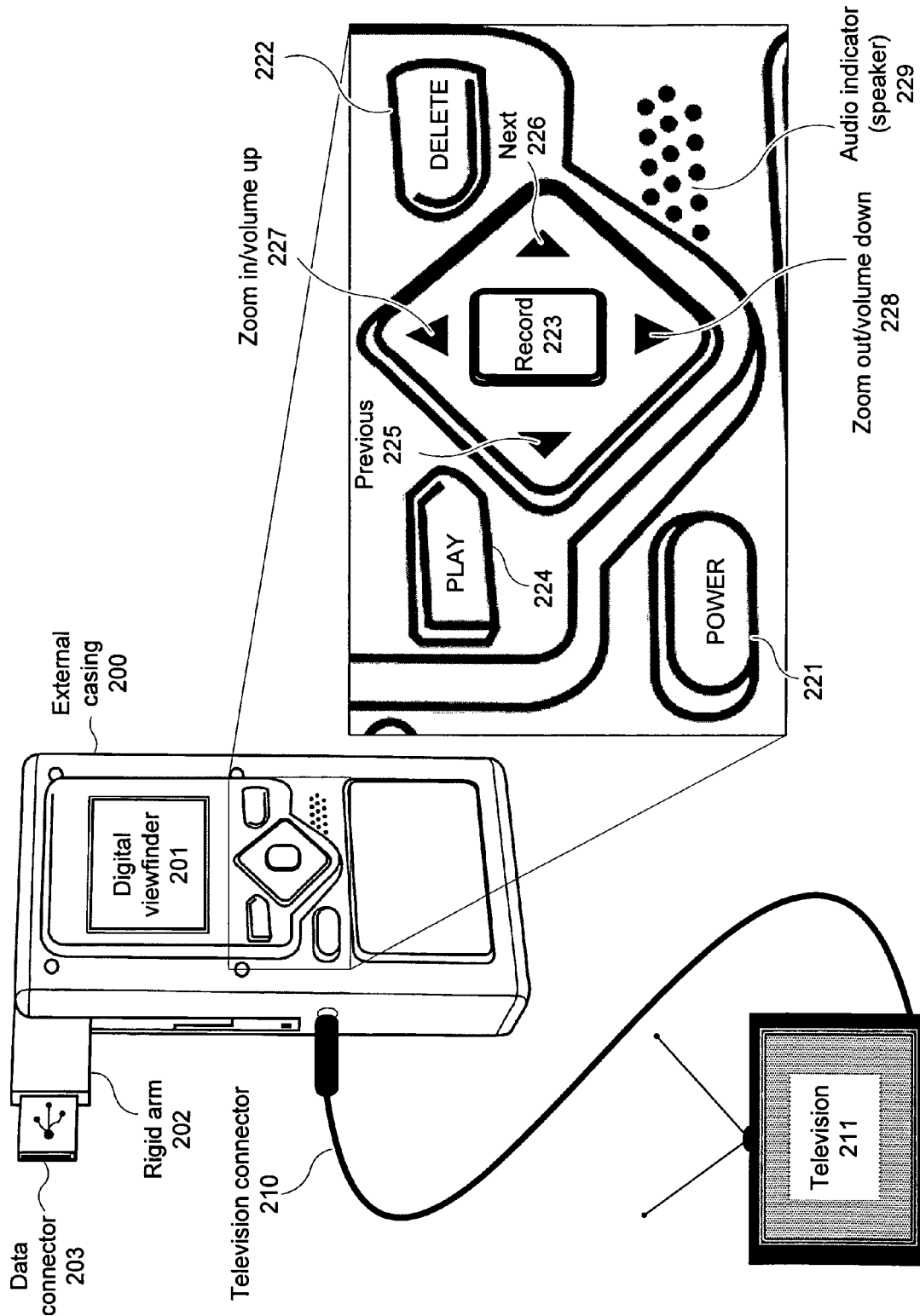
FIG. 2 illustrates user-manipulatable controls and interfaces in one embodiment of a digital video camera.

FIG. 2 illustrates user-manipulatable controls and interfaces in one embodiment of a digital video camera. As illustrated in FIG. 2, one embodiment of a digital video camera can include an external casing 200 of the camera body, a digital viewfinder 201, a data connector 203 attached to an arm 202, and an audio indicator 229. The digital video camera may also have interface buttons including a power button 221, a delete button 222, a record button 223, and a play button 224. The interface buttons may also include a previous button 225, a next button 226, a zoom in/volume up button 227, and a zoom out/volume down button 228, which may be located on a four-position rocker switch. The digital video camera may also be connected to a television 211 through television connector 210, such that digital video or other images can be displayed on the television 211.

One embodiment of a digital video camera includes an external casing 200 that is designed to enclose the internal components of the digital video camera. External casing 200 may also be designed to address such considerations as ease of use and durability. For instance, external casing 200 may be sized so that the digital video camera can fit easily into a user's pocket. External casing 200 may also be manufactured from a hard plastic, metal, or other durable material to improve durability of the digital video camera. In an embodiment where external casing 200 is manufactured from a durable material, external casing 200 can protect the internal components of the digital video camera from physical shock, moisture, and other harmful elements.

In one embodiment of a digital video camera, arm 202 is permanently attached to the camera body. Arm 202 may have a data connector 203. The arm 202 and data connector 203 assembly can retract into the camera body, or extend from the camera body. When extended, the dimensions of the arm 202 and data connector 203 assembly provide sufficient clearance so that the data connector 203 can be inserted directly into an appropriate receptacle on an external device such as a computer system or a processing station. After the data connector 203 has thus connected the digital video camera to the external device, data can be transferred through the data connector 203 from the internal memory of the digital video camera to the external device.

In one embodiment of a digital video camera, an audio indicator 229 may be located on or near the surface of the external casing 200. The audio indicator 229 may include a speaker or piezoelectric device. The position of the audio indicator in one embodiment can be selected so that sound from the audio indicator 229 is directed towards the optimal position for a user to view the digital viewfinder 201. Thus, a user in the best position to view video content on the digital viewfinder 201 would also be in the best position to hear the corresponding sound from the audio indicator 229. The audio indicator 229, in one embodiment, may play sound from audio data associated with digital video footage. Audio indicator 229 may also play sound from other types of audio data, such as audio data associated with a still photo shot, or audio data that is not associated with any still images or video content.

One embodiment of a digital video camera includes a set of interface buttons. These may include buttons such as a power button 221 for enabling power supply 114, a delete button 222 for deleting data from the digital video camera's non-volatile memory 131, a record button 223 for beginning and ending capture of digital video footage, and a play button 224 for playing digital video footage, playing audio, or viewing images from the digital video camera's non-volatile memory 131. The interface buttons may also include a previous button 225, a next button 226, a zoom in/volume up button 227, and a zoom out/volume down button 228. The previous 225, next 226, zoom in/volume up 227, and zoom out/volume down 228 buttons may be located on a four-position rocker switch. In one embodiment, the interface buttons are positioned and sized to facilitate one-handed operation of the digital video camera. For example, the interface buttons may be centrally located and sufficiently large so that all of the buttons are accessible to a user's hand that is holding the digital video camera. In one embodiment, the interface buttons are arranged so that the digital video camera can be held and used in a vertical orientation.

One embodiment of a digital video camera provides that a television connector 210 can be plugged into the digital video camera. Television connector 210 then allows the transmission of a signal from the digital video camera to a television 211 which may be connected to the other end of the television connector 210. The digital video camera may transmit analog or digital signals through television connector 210 to facilitate the display of data from the digital video camera's internal memory on the screen of the television 211. The digital video camera may also transmit signals corresponding to images from the digital video sensor. In one embodiment, television 211 may assume some or all of the functions of the digital viewfinder 201. The digital video camera may further display a user interface on the screen of the television 211. A user may then be able to interact with the user interface displayed on the screen of television 211 by manipulating the interface buttons of the digital video camera. In an embodiment of a digital video camera that provides for a connection to a television 211 through a television connector 210, a user may be able to view digital video footage stored on the digital video camera's non-volatile memory for data storage on the screen of television 211. The user may also be able to use the television 211 to frame a scene to be captured as digital video footage, or to view an ongoing capture of digital video footage on the television 211.

Figure 3:
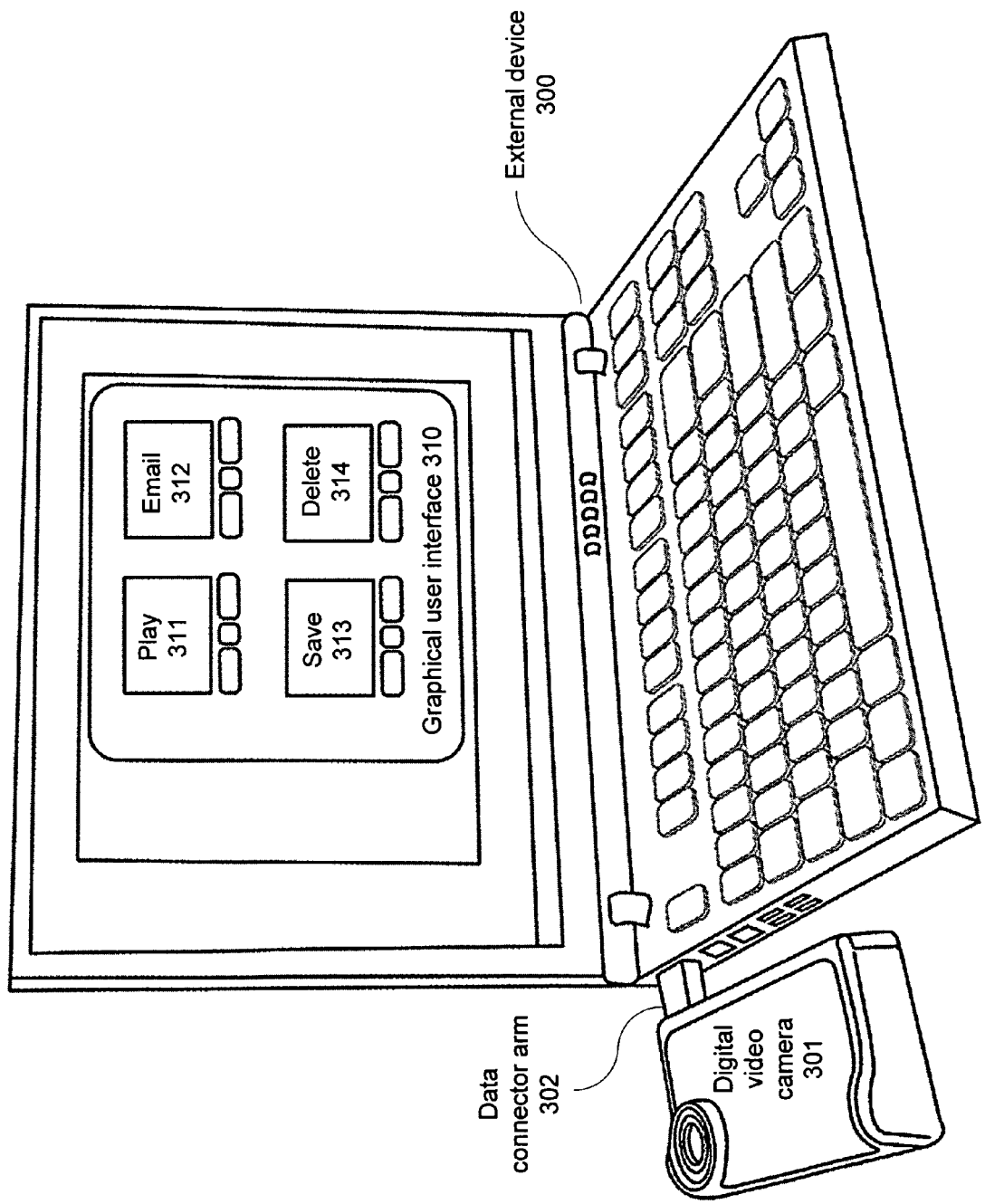
FIG. 3 illustrates a digital video camera connected to a computer system according to one embodiment.

FIG. 3 illustrates a digital video camera connected to a computer system according to one embodiment. After using the digital video camera 301 to capture digital video footage, a user can extend the data connector arm 302, which may be a rigid arm having an attached data connector. Once the data connector arm 302 is in the extended position, the data connector can be used to attach the digital video camera 301 directly to an external device 300. As illustrated in FIG. 3, digital video camera 301 is connected through data connector arm 302 to external device 300. External device 300 is a device external to the body of the digital video camera. In one embodiment, external device 300 is a computer system such as a personal computer (PC). External device 300 can also be a download and processing station such as an in-store kiosk where video footage can be viewed, edited, or recorded on a digital video disc (DVD) or other media.

In one embodiment, the external device 300 can detect when a connection is made between the digital video camera 301 and the external device 300. For instance, the data connector arm 302 may conform to a data transfer protocol such as the Universal Serial Bus (USB) protocol that specifies mechanisms for detecting when such a connection has been established.

After the digital video camera 301 is connected to the external device 300, the digital video camera 301 may identify itself to the external device 300 as a mass storage device, such as a removable disk drive or a compact disc (CD) drive. In one embodiment, for instance, a digital video camera 301 plugged into a PC may identify itself as a removable disk drive to an operating system running on the PC. The operating system can then treat the internal memory of the digital video camera 301 like any other removable disk. The internal memory of the digital video camera 301 may also be formatted using a file system format compatible with the operating system. For example, the non-volatile memory for data storage of a digital video camera 301 to be used with a PC may be formatted according to the New Technology File System (NTFS) or File Allocation Table (FAT) file system formats so that data contained on the non-volatile memory is accessible to an operating system such as a Windows® operating system. The user can then access the contents in the non-volatile memory of digital video camera 301 in the same manner as any other removable disk, using the standard operating system interface.

The digital video camera 301 may allow the user to have full access to the contents of the internal memory, or the digital video camera 301 may restrict the user's access to the contents of the internal memory in some way. In some embodiments, for example, the digital video camera 301 may identify itself as a CD drive. The user may then have read-only access to the non-volatile memory of the digital video camera 301. In some embodiments, the internal memory may be partitioned so that a user can have full access to part of the internal memory while having read-only access to another part of the internal memory. For example, the camera's non-volatile memory for data storage may be divided into two partitions, where one partition is identified to the operating system as a CD drive, and the other partition is identified as a removable disk drive. The operating system may then allow only read access for the partition identified as a CD drive while allowing read and write access for the partition identified as a removable disk drive. The digital video camera 301 may also employ other methods for restricting access to data stored in its internal memory.

In one embodiment where a digital video camera 301 behaves like a general-purpose mass storage device, a user may also upload data files to the internal memory. The uploaded data can then interact with the interface of the digital video camera 301. For example, a user may connect digital video camera 301 to a PC, then upload digital video files from the PC to the camera. The user may then use the interface of the digital video camera 301 to view the uploaded videos on the screen of digital video camera 301. In other embodiments, a user may store other types of data files, such as audio or still image files, in the internal memory and interact with the files in a similar manner by using the camera's interface. A user may also wish to store data files on the internal memory for other reasons, such as backup or transfer to another computer system.

In one embodiment, a resident software application is stored in the non-volatile memory for data storage of the digital video camera 301. When a connection between the digital video camera 301 and the external device 300 is detected, an operating system running on external device 300 may automatically execute the resident software application. For example, a Windows® operating system may be configured to check the contents of the non-volatile memory of the digital video camera 301 for an "autoplay.inf" file upon detecting a connection between the digital video camera 301 and the external device 300. The "autoplay.inf" file then directs the operating system to the resident software application, which is stored in the non-volatile memory of digital video camera 301. The operating system of the external device 300 then executes the resident software application.

Upon execution, the resident software application may check the external device 300 to determine if required software components are available, then install the software components in the external device 300 if the software components are not available on the external device 300. For example, the resident software application may determine if certain compression-decompression algorithms (codecs) are available on the external device 300. If the resident software application determines that the codecs are not available on the external device 300, the resident software application may then automatically install the codecs on the external device 300 without additional user intervention. In other embodiments, the resident software application may wait for verification from a user before installing the software components. The resident software application may also install other software components such as software libraries or application files. The resident software, in one embodiment, may also cause data to be written to memory in the external device 300 for tracking purposes. For instance, the resident software may add entries or keys to the registry of a computer running the Windows® operating system so that upon a subsequent connection to the same computer, the resident software application can simply check the registry entries or keys to determine which codecs or software components were previously installed.

In one embodiment, the resident software application may produce a graphical user interface (GUI) 310 on a display associated with the external device 300. The GUI 310 may present a user with graphical controls to help the user to perform various tasks. Such tasks may include saving digital video files from the non-volatile memory of the digital video camera 301 to memory accessible to the external device 300, playing digital video footage, deleting data from the non-volatile memory of the digital video camera 301, and attaching a digital video clip to an email message. For purposes of illustration, FIG. 3 depicts a play control 311, an email control 312, a save control, 313, and a delete control 314, which help a user to perform these tasks.

The resident software application may perform a save function in response to a user selecting the save control 313. In one embodiment, the resident software application saves data, which may be digital video footage, from the non-volatile memory of the digital video camera 301 to memory accessible to the external device 300. The resident software application may also copy files from a host computer into the internal memory of the camcorder (with internal memory or plug in memory cards). Thus, the GUI 310 allows the user to copy files onto the camcorder, through the arm, either for viewing on the camcorder, for taking them for processing on the server, or similar function. The GUI 310 allows the user to copy files of any other file type (pictures, music, etc.) into the internal memory of the camcorder.

The resident software application may perform a delete function in response to a user selecting the delete control 314 by removing data from the non-volatile memory of the digital video camera 301. The resident software application may also have the capability to delete data from the memory of the external device 300.

The resident software application may play digital video footage in response to a user's selection of the play control 311. The resident software may play the software by executing its own code to decompress, decode, and display the digital video footage, or the resident software may direct a separate application to display the digital video footage. The digital video footage played by the resident software application may be stored in the non-volatile memory of the digital video camera 302 or any other memory accessible to the external device 300.

The resident software application may, in response to a user's selection of the email control 312, prepare an email message having an attached digital video clip. For instance, a user may wish to share a digital video clip with a contact by sending the digital video clip to the contact through email. The resident software application may compress the digital video clip so that the file size of the digital video clip does not exceed a predetermined limit. For instance, the resident software application may apply an appropriate level of compression to a digital video clip to reduce the file size of the video clip so that it does not exceed 10 megabytes. The reduced file size allows the digital video clip to be attached to an email and more easily transmitted over a computer network having limited bandwidth. The predetermined limit for the file size may be set by a camera provider, such as a manufacturer, distributor, or retailer of the digital video camera, or the predetermined limit may be specified by the user. The resident software application may also compress a digital video clip to meet other criteria, such as a desired bit rate or image quality. As with the predetermined file size limit, the compression levels associated with these criteria may be set by a camera provider or by the user. The resident software application may compress a digital video clip according to a Moving Picture Experts Group (MPEG) MPEG-1, MPEG-2, MPEG-4, Motion Joint Photographic Experts Group (M-JPEG) standard or another standard for encoding digital video files.

The resident software application may then invoke an email client to create a new email message to which the compressed digital video file is attached. The email client may be a separate application installed on the external device, or may also be part of the resident software application. In one embodiment, the resident software application may detect a pre-existing installation of an email client on the external device 300. After the pre-existing installation of the email client has been detected, the resident software application locates and executes an executable file of the installed email client. In one embodiment, the resident software application then uses the Messaging Application Programming Interface (MAPI) to interface with the email client. In one embodiment, the resident software application may thus create an email message and attach a digital video file to the email message without additional prompting by the user. After the resident software application invokes the email client to create a new email message to which the digital video clip is attached, the user may be given an opportunity to address the email message or complete other fields in the email message such as the subject line and message body. The user can then send the email.

In one embodiment, the resident software application may upload the digital video clip to a remote server in response to a user's selection of the email control 312. The resident software application can then invoke the email client to create a new message and embeds in the new message a link to the location of the digital video clip on the remote server. Thus, a user can simply send a link to the digital video clip instead of having to send the digital video clip.

Figure 4:
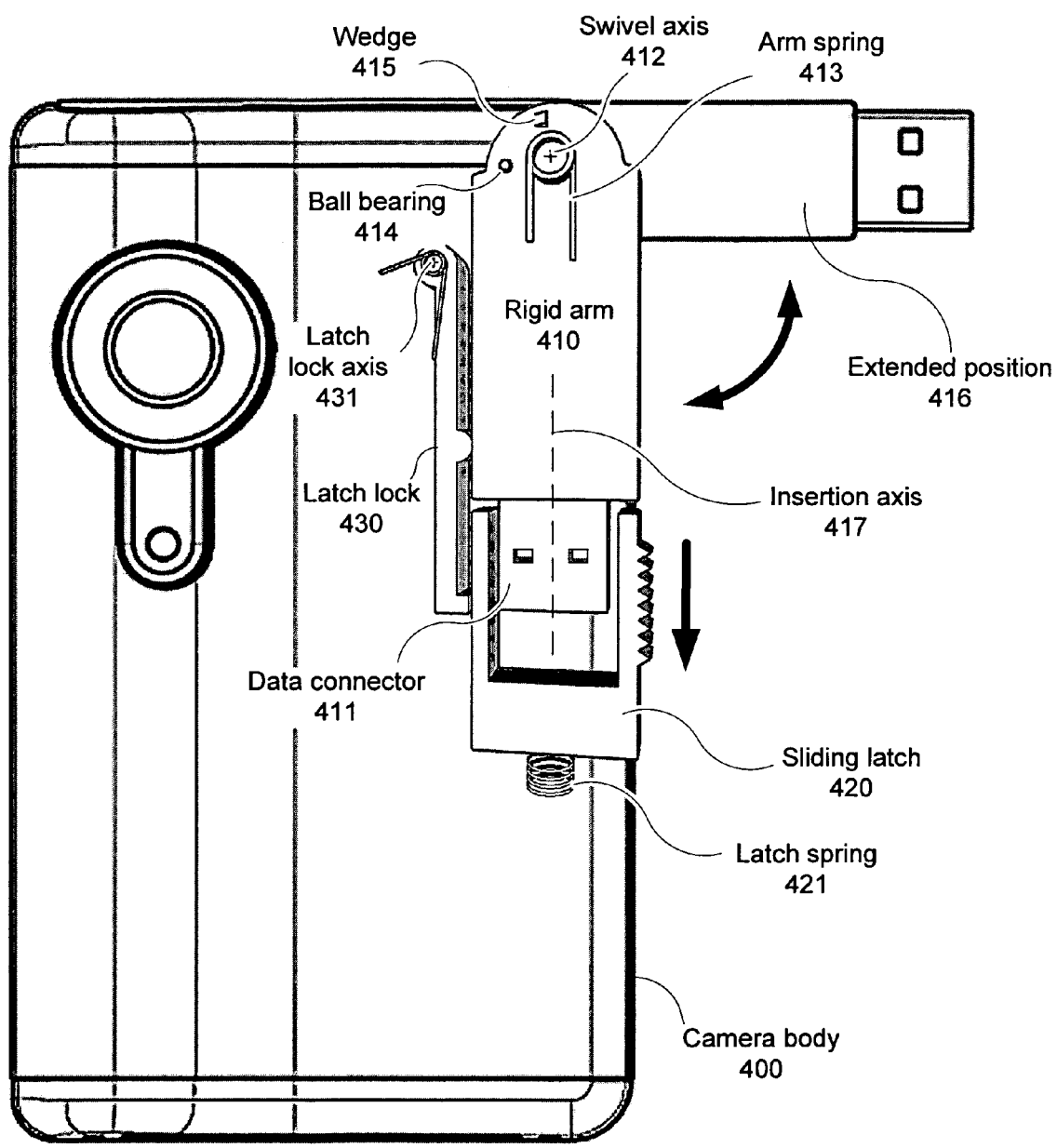
FIG. 4 illustrates a retractable data connector arm according to one embodiment of a digital video camera having a retractable data connector arm.

FIG. 4 illustrates a retractable data connector arm according to one embodiment of a digital video camera having a retractable data connector arm. Camera body 400 contains an actuation mechanism for extending and retracting the data connector arm that includes a sliding latch 420; a latch spring 421; a latch lock 430, which rotates about latch lock axis 431; and an arm spring 413. The actuation mechanism allows for the data connector arm to extend sufficiently beyond the camera body 400 so that the data connector 411 may be connected to an external device, such as a computer. The data connector arm includes an arm 410 that can rotate about swivel axis 412, which is perpendicular to insertion axis 417; a data connector 411, which can be inserted into a device external to camera body 500 in a direction parallel to insertion axis 417; and a locking mechanism which may be implemented using ball bearing 414 and wedge 415. Data connector 411 may conform to the physical form requirements of a standard such as the USB standard, the IEEE 1394 standard, or another similar standard for a data transfer protocol.

When the data connector arm, which includes the arm 410 and the data connector 411, is in a retracted position, the data connector arm is contained within the camera body 400. When the data connector arm is in the retracted position, sliding latch 420 is in a raised position and is held in place against the arm 410 with pressure supplied by latch spring 421. Sliding latch 420, while in the raised position, prevents the data connector arm from swiveling out from the camera body 400. While in the retracted position, the data connector arm also bears against latch lock 430.

During operation of the actuation mechanism, a user may slide the sliding latch 420 against the pressure of latch spring 421 and away from the data connector arm until the data connector arm is no longer blocked by sliding latch 420. The data connector arm is then free to swivel out from the camera body with pressure from arm spring 413. A friction locking mechanism may be implemented with a ball bearing 414, which maintains its position relative to the camera body 400 and bears against the data connector arm with pressure supplied from a spring (not shown), and a wedge 415, which rotates with the arm. When the data connector arm is moved into extended position 416, the ball bearing 414 slides over the wedge 415 to lock the data connector arm in the extended position.

A user moving sliding latch 420 away from the data connector arm to release the data connector arm also moves the top of sliding latch 420 beyond the lower end of the latch lock 430. The data connector arm, having rotated outward, no longer bears against latch lock 430. Latch lock 430 is then free to swivel slightly outward about latch lock axis 431 so that the lower edge of latch lock 430 prevents sliding latch 420 from moving back into the raised position. Sliding latch 420 is thus locked into a lowered position by latch lock 430 so that the data connector arm can be later retracted.

When the data connector arm is in an extended position 416, a user may retract the data connector arm back into the camera body 400 by pushing the data connector arm back into the camera body 400 against the pressure of arm spring 413 and with sufficient force to overcome the friction locking mechanism. The data connector arm then rotates back into the camera body 400, rotating about swivel axis 412. As the data connector enters the camera body 400, the data connector arm pushes aside latch lock 430 so that the bottom end of latch lock 430 no longer bears against the top of sliding latch 420. Sliding latch 420 is then free to move into the raised position with pressure from latch spring 421, where it once again prevents the data connector arm from swiveling out from the camera body 400.

Figure 5:
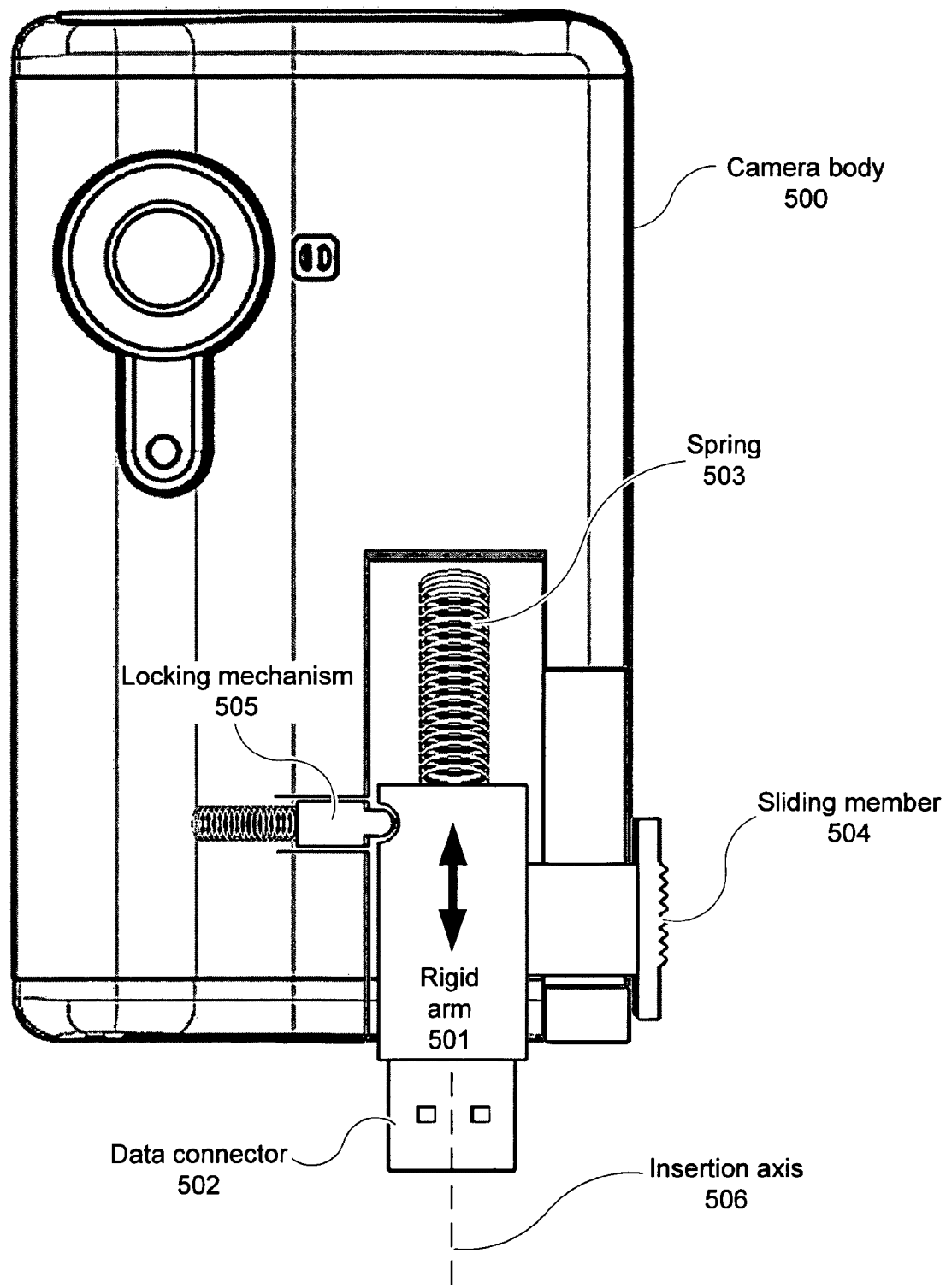
FIG. 5 illustrates a retractable data connector arm according to one embodiment of a digital video camera having a retractable data connector arm.

FIG. 5 illustrates a retractable data connector arm according to one embodiment of a digital video camera having a retractable data connector arm. Contained within camera body 500 is an actuation mechanism for extending and retracting the data connector arm. The actuation mechanism may include a spring 503, a sliding member 504, and a locking mechanism 505. The data connector arm may include an arm 501, which is attached to data connector 502. Data connector 502 can be inserted into a device external to the camera body in a direction parallel to insertion axis 506. Data connector 502 may conform to the physical form requirements of a standard such as the USB standard, the IEEE 1394 standard, or another similar standard for a data transfer protocol.

In a retracted position, the data connector arm, including arm 501 and data connector 502, is contained within the camera body 500. A user may extend the data connector arm by moving the sliding member 504, which is attached to the data connector arm, so that the data connector arm extends from the camera body 500 in a direction parallel to insertion axis 506. In one embodiment, the extension of the data connector arm is aided by spring 503. In other embodiments, the spring 503 is not present. When the data connector arm is fully extended, a locking mechanism 505 may lock the data connector arm in the extended position. From the extended position, the data connector arm may be retracted back into the camera body 500 by releasing the locking mechanism 505 and moving the sliding member 504 so that the data connector arm moves into the camera body 500 in a direction parallel to insertion axis 506.

Figure 6:
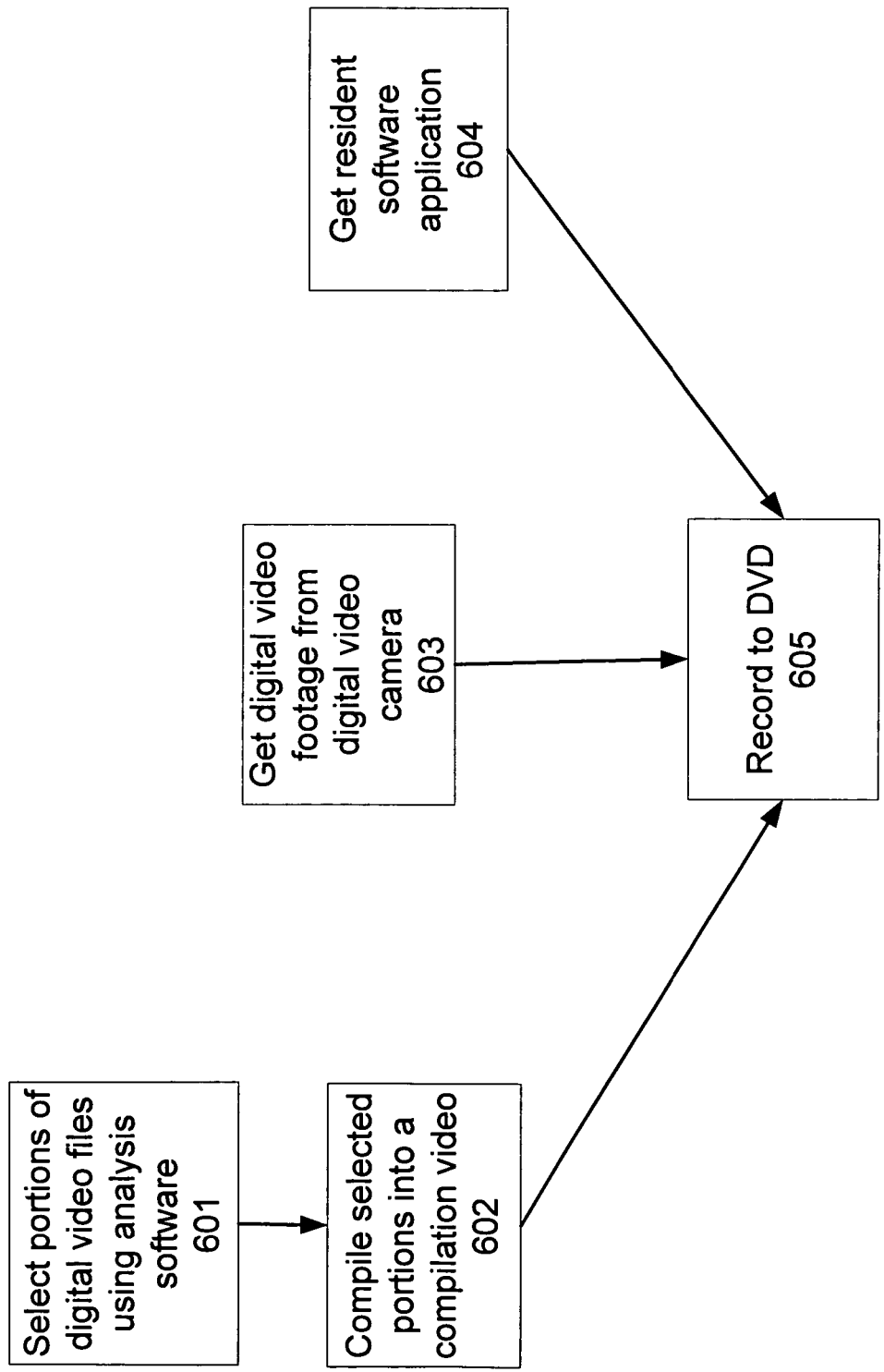
FIG. 6 illustrates a process for composing a digital video disc (DVD) containing digital video footage.

FIG. 6 illustrates a process for recording a digital video disc (DVD) containing digital video footage. A digital camera as described in the above embodiments can be used to create a DVD containing digital video footage. In one embodiment, the recording of a DVD 605 is preceded by the collection and preparation of data to be recorded on the DVD. These tasks include getting digital video footage from the digital video camera 603, selecting portions of the digital video files using analysis software 601, compiling the selected portions into a compilation video 602, and getting the resident software application 604.

Getting digital video footage from the digital video camera 603 may be accomplished by plugging a data connector arm of the digital video camera into and external device, then transferring the digital image data from the non-volatile memory of the digital video camera to the memory of the external device. Getting the digital video footage 603 may also be accomplished by merely making the non-volatile memory of the digital video camera accessible to the external device. Once the digital video footage is accessible to the external device, the digital video footage is ready to be recorded onto the DVD 605.

Once the digital video footage from the digital video camera is available to the external device, analysis software can be used to select portions of the digital video files 601. The analysis software may select portions of digital video files based on the content of the portions. For instance, the analysis software may select portions of the digital video files having a certain amount of motion or a certain minimum image quality. The analysis software may also select portions of the digital video files based on other criteria. The portions selected by the analysis software may be subsequently compiled into a compilation video 602. When the finished compilation video is available to the external device, then the compilation video is ready to be recorded onto the DVD 605.

Getting the resident software application 604 may be accomplished simply by making the resident software application available to the external device. The resident software application can be a software application that generates a graphical user interface. The resident software may be a program that when executed on an external device facilitates saving a digital video clip as a video file in the external device, emailing the digital video clip, and deleting the digital video clip from the non-volatile memory. In one embodiment, the resident software application can be obtained from the internal memory of the digital video camera. In other embodiments, a copy of the resident software application may also be maintained in a memory of the external device, and thus be available to the external device. When the resident software application is available to the external device, the resident software application is ready to be recorded to the DVD 605.

When all of the data to be recorded to the DVD has been made available to the external device, the DVD can be recorded 605. In one embodiment, the DVD is recorded by a DVD drive attached to the external device. Since the data to be recorded to the DVD is available to the external device, the external device is able to transfer the necessary data, which may include compilation videos, digital video footage, and a resident software application, to the DVD drive for recording. The resulting DVD can then be used to play back or share the digital video footage contained on the DVD. If a resident software application is included on the DVD, the resident software application may facilitate the playing and sharing of the digital video footage.

The embodiments described above are merely illustrative of the principles of the invention. It will be apparent to one who is skilled in the art that many other variations and modifications can be made to the above-described embodiments without departing from the spirit and scope of the invention. The scope of the invention is therefore to be interpreted in accord with the limits set forth by the appended claims.

What is claimed is:

1. An apparatus comprising:
a digital video image sensor;
a camera body to contain the digital video image sensor;
an internal memory to store digital video data captured by the digital video image sensor;
an arm permanently attached to the camera body and operable to extend from and retract into the camera body;
a data connector having an insertion axis and permanently attached to the arm to transfer the digital video data to a device external to the camera body, wherein the data connector adheres to a standard for connecting peripheral devices; and
a spring mechanism that causes the arm to rotate about an axis perpendicular to the insertion axis of the data connector; and
a sliding latch included on the camera body and configured to lock the data connector in a retracted position when the sliding latch is in a raised position and, when activated, releases the spring mechanism which causes the arm to extend from the camera body.

2. The apparatus of claim 1, wherein the data connector conforms to a Universal Serial Bus (USB) standard for connecting peripheral devices.

3. The apparatus of claim 1, further comprising only the following user operable buttons:
a playback button to enable viewing of the captured digital video data from the internal memory;
a delete button to enable deletion of the captured digital video data from the internal memory;
a record button to control capturing of the digital video data;
a power button to enable a power supply to the apparatus; and
a rocker switch having soft-key functions determined by a mode in which the apparatus is operating.

4. The apparatus of claim 1, further comprising:
a television connector to connect the apparatus to a television;
a playback button to cause a displaying of the digital video footage on the television; and
a delete button to delete the digital video footage in the internal memory.

5. An apparatus comprising:
a digital video image sensor;
a camera body to contain the digital video image sensor;
an internal memory to store digital video data captured by the digital video image sensor;
an arm permanently attached to the camera body and operable to extend from and retract into the camera body;
a data connector having an insertion axis and permanently attached to the arm to transfer the digital video data to a device external to the camera body, wherein the data connector adheres to a standard for connecting peripheral devices;
a spring mechanism that causes the arm to rotate about an axis perpendicular to the insertion axis of the data connector; and
a locking mechanism to hold the arm in an extended position, wherein the locking mechanism comprises a wedge and a ball bearing.

6. The apparatus of claim 1, further comprising a latch lock configured to prevent the sliding latch from moving into the raised position.

7. A digital hand-held device, comprising:
a body;

a data connector having an insertion axis configured to couple the device to a second device external to the device;

an arm operable to extend from the body and retract into the body, wherein the data connector is attached to the arm;

a spring mechanism that causes the arm to rotate about an axis perpendicular to the insertion axis of the data connector; and a locking mechanism to hold the arm in an extended position, wherein the locking mechanism comprises a wedge and a ball bearing.

8. The device of claim 7, further comprising a sliding latch that, when activated, releases the spring mechanism which causes the arm to extend from the body.

9. The device of claim 8, wherein the sliding latch is included in the body and is configured to lock the data connector in a retracted position when the sliding latch is in a raised position.

10. The device of claim 9, further comprising a latch lock configured to prevent the sliding latch from moving into the raised position.

11. The device of claim 7, wherein the data connector conforms to a Universal Serial Bus (USB) standard for connecting peripheral devices.

12. The device of claim 7, wherein the device comprises a digital camera.

13. The device of claim 7, wherein the device comprises a digital video camera.

* * * * *